US012585786B2

(12) United States Patent
Hou

(10) Patent No.: US 12,585,786 B2
(45) Date of Patent: Mar. 24, 2026

(54) AUTHENTICATION OF DEVICE CONFIGURATIONS FOR AUTHENTICATED DEVICES

(71) Applicant: Fortinet, Inc., Sunnyvale, CA (US)

(72) Inventor: Li Hou, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 65 days.

(21) Appl. No.: 18/617,288

(22) Filed: Mar. 26, 2024

(65) Prior Publication Data
US 2025/0307415 A1     Oct. 2, 2025

(51) Int. Cl.
*G06F 21/57*          (2013.01)

(52) U.S. Cl.
CPC .................................. *G06F 21/577* (2013.01)

(58) Field of Classification Search
CPC ...................................................... G06F 21/577
See application file for complete search history.

(56) References Cited

U.S. PATENT DOCUMENTS 6,298,445 B1 * 10/2001 Shostack ................. H04L 63/12
                                                          726/25
7,233,997 B1 *  6/2007 Leveridge ........... H04L 63/0815
                                                          709/219

10,678,672 B1 *  6/2020 Makohon ................ H04L 43/50
10,885,516 B2 *  1/2021 Jenks .................. G06Q 20/3823
2005/0114578 A1 *  5/2005 Lewis .................... G06F 21/577
                                                          710/260
2010/0064048 A1 *  3/2010 Hoggan ................ G06F 21/575
                                                          709/229
2014/0359239 A1 * 12/2014 Hiremane .......... G06F 11/0766
                                                          711/163
2020/0387611 A1 * 12/2020 Yao ........................ G06F 21/572
2023/0075355 A1 *  3/2023 Twigg ................... H04L 67/306
2024/0346125 A1 * 10/2024 Ramaiah .............. G06F 21/602

FOREIGN PATENT DOCUMENTS

CN       105677363 A   *  6/2016   .............. G06F 8/71
CN       113206858 B   * 12/2022   ......... H04L 63/1458
EP         2927836 A1   * 10/2015   ............. G06F 21/34
JP         4068473 B2   *  3/2008   ............. G06F 3/067

* cited by examiner

*Primary Examiner* — John B King
(74) *Attorney, Agent, or Firm* — Jaffery Watson Hamilton & DeSanctis LLP

(57)          ABSTRACT

Validation of a firmware image on a client device is disclosed. Information corresponding to one or more addresses of an image stored on a client device is periodically requested via an application program interface (API) configured to provide access to the image on the client device. The requested information from the image on the client device is compared with the image stored on the server image with stored validation information corresponding to a valid version of the image. An indication is generated if the information from the image on the client device does not match the stored validation information.

20 Claims, 6 Drawing Sheets

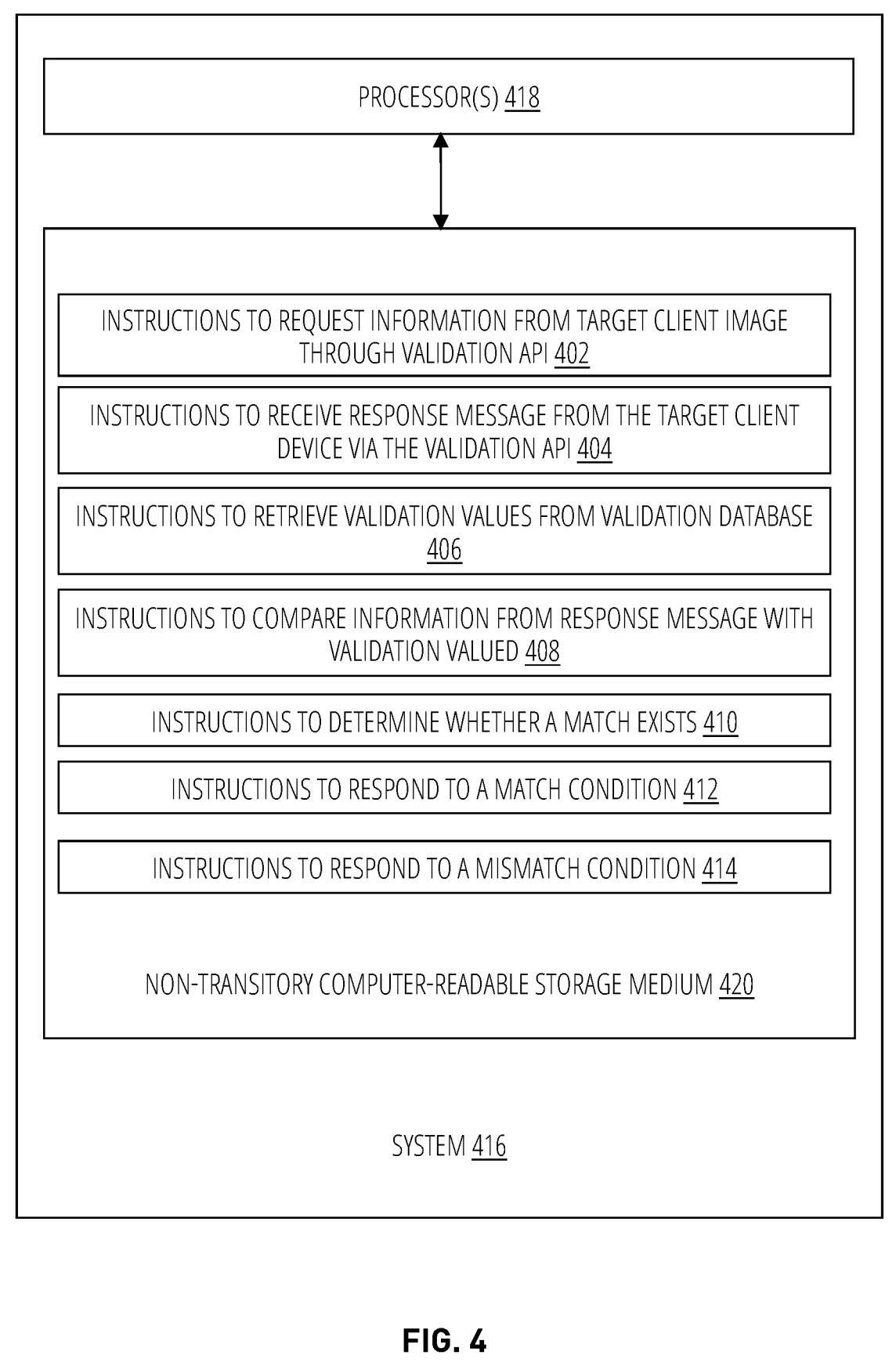

PROCESSOR(S) 418

INSTRUCTIONS TO REQUEST INFORMATION FROM TARGET CLIENT IMAGE THROUGH VALIDATION API 402

INSTRUCTIONS TO RECEIVE RESPONSE MESSAGE FROM THE TARGET CLIENT DEVICE VIA THE VALIDATION API 404

INSTRUCTIONS TO RETRIEVE VALIDATION VALUES FROM VALIDATION DATABASE 406

INSTRUCTIONS TO COMPARE INFORMATION FROM RESPONSE MESSAGE WITH VALIDATION VALUED 408

INSTRUCTIONS TO DETERMINE WHETHER A MATCH EXISTS 410

INSTRUCTIONS TO RESPOND TO A MATCH CONDITION 412

INSTRUCTIONS TO RESPOND TO A MISMATCH CONDITION 414

NON-TRANSITORY COMPUTER-READABLE STORAGE MEDIUM 420

SYSTEM 416

FIG. 4

AUTHENTICATION OF DEVICE CONFIGURATIONS FOR AUTHENTICATED DEVICES

BACKGROUND

Many secure operating environments (e.g., cloud-based enterprise services) interact with devices configurable by the end user at some level. When a user changes the device, for example, by installing a new application or changing network settings, traditional security mechanisms can detect and analyze the change. If an inappropriate change has been made, these traditional security mechanisms can provide a reactive response, including, for example, blocking the device and/or notifying security administrators.

However, particular security vulnerabilities can result from replacing an image that appears to be the original image upon a superficial review (e.g., file name, file size), but the replacement image includes subtle modifications that introduce security vulnerabilities. This situation is very difficult to detect and can result in security breaches.

BRIEF DESCRIPTION OF THE DRAWINGS

To easily identify the discussion of any particular element or act, the most significant digit or digits in a reference number refer to the figure number in which that element is first introduced.

FIG. 4 is an example of a system (e.g., validation server or similar) to identify an image that has replaced an authenticated image.

DETAILED DESCRIPTION

Figure 1:
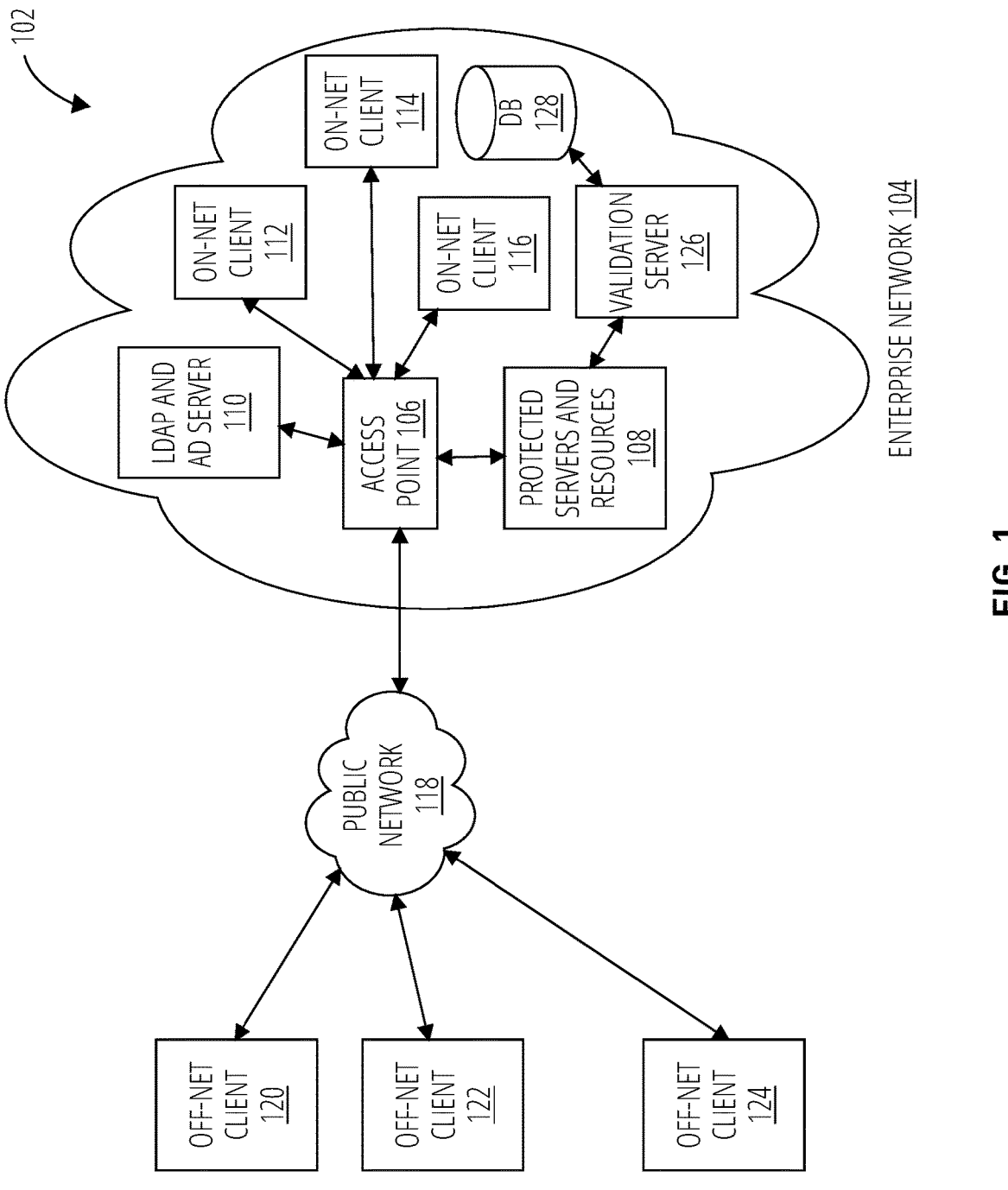
FIG. 1 is a block diagram illustrating an operating environment in which various embodiments of the present disclosure may be employed.

In the following description, numerous specific details are outlined to provide a thorough understanding of the embodiments of the present disclosure. It will be apparent, however, to one skilled in the art that embodiments of the present disclosure may be practiced without some of these specific details. In other instances, well-known structures and devices are shown in block diagram form.

As discussed above, the replacement of an original, authenticated image can be difficult to prevent but must be identified to maintain the security provided by the original, authenticated image. As one of many use case examples, firmware in an appliance (or virtual machine) can be installed or upgraded by an end user (or end user administrator) so that the end user's configuration is running over the original firmware (or virtual machine). The end user may want to ensure the running appliance is secure (e.g., without unauthorized changes). However, the end user may not be able to determine that the replacement firmware (or virtual machine) has been changed to manipulated firmware (or virtual machine) with similar capability to run the end user's configuration but may also include security vulnerabilities (e.g., a backdoor or modified flow path or other unexpected functionality) that are unknown until a problem arises.

In the examples provided below, a firmware validation infrastructure is described that could be used to validate the firmware. In an example, the firmware validation architecture includes an application program interface (API) on the running firmware side to calculate and report values (e.g., the hash value of the loaded firmware and/or hash value of several locations in the loaded firmware) and a validation server. In an example, the validation server provides a set of new locations in the image whenever a new inquiry occurs, whether from the same client or a different client. This is to avoid hackers simply modifying the verification function to hardcode the value in response.

In an example, the validation server has a database that stores all known firmware hash values. If the hash value received by the validation server via the API differs from the value it should be, then the firmware has been manipulated. This approach is based on the truth that the firmware hash value will be different if there is any change in the firmware, even if the functionality appears to be the same. Similar approaches can be applied to the validation of virtual machines.

Brief definitions of terms used throughout this application are given below.

An "image" refers to a file that contains the code for a specific device or system. Thus, a "firmware image" is a file that contains the firmware code for a specific device or system. The image file can include the necessary code for a device along with configuration settings, data structures, and/or other information required for the device to function properly. Firmware images differ from traditional application code because they contain all the necessary systems software to make hardware work (and may or may not include an operating system to achieve this result). Firmware images are commonly used in device such as computer systems, laptop computers, tablets, routers, printers, camera and other electronic devices. Firmware images are also used in other applications, such as industrial control systems, smart home devices, aviation, automotive applications, medical systems, military technologies, etc.

The term "client" generally refers to an application, program, process, or device in a client/server relationship that requests information or services from another program, process, or device (a server) on a network. Importantly, "client" and "server" are relative since an application may be a client to one application but a server to another. The term "client" also encompasses software that makes the connection between a requesting application, program, process, or device to a server possible, such as a file transfer protocol (FTP) client.

The phrase "endpoint protection platform" generally refers to cybersecurity monitoring and/or protection functionality performed on behalf of an endpoint (or client) device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may provide monitoring and/or protection functionality on behalf of the endpoint device via an agent, which may be referred to herein as an "endpoint security agent" deployed on the endpoint device. Non-limiting examples of an endpoint protection platform include the FORTIEDR Software as a Service (SaaS) platform and the FORTICLIENT integrated endpoint protection platform available from Fortinet, Inc. of Sunnyvale, CA. In some examples, the endpoint protection platform is a participant in a cybersecurity mesh architecture (CSMA) in which various cybersecurity products/solutions/tools of a given cybersecurity or networking security vendor or across a group of participating vendors achieve a more integrated security policy by facilitating interoperability and communication among the various cybersecurity products/solutions/tools (e.g., network security appliances, a secure access service edge (SASE) platform, etc.).

The phrase "endpoint security agent" generally refers to endpoint software that runs on an endpoint device (e.g., a desktop computer, a laptop computer, or a mobile device) and monitors for cybersecurity issues arising on the endpoint device and/or protects the endpoint device against cybersecurity issues. In some examples, the endpoint security agent may be deployed on the endpoint device as a fabric agent that delivers protection, compliance, and secure access in a single, modular, lightweight client. A fabric agent may be endpoint software that runs on an endpoint device and communicates with a telemetry connection or a cybersecurity mesh (e.g., the Fortinet Security Fabric available from Fortinet, Inc. of Sunnyvale, CA) to provide information, visibility, and control to that device. In some examples, the endpoint security agent may be in the form of a lightweight endpoint agent that utilizes less than one percent of CPU and less than 100 MB of RAM and may leverage, among other things, various security event classification sources provided within one or more associated cloud-based security services.

A non-limiting example of an endpoint security agent is the FORTICLIENT Fabric Agent available from Fortinet, Inc. of Sunnyvale, CA. In one example, to simplify the initial deployment and offload ongoing monitoring, an endpoint security agent may be managed and/or supported by one or more endpoint-focused managed services, for example, to provide setup, deployment, configuration, vulnerability monitoring, and overall endpoint security monitoring. In the context of a CSMA, the endpoint security agent may communicate with an endpoint protection platform, one or more network security appliances, and/or one or more cloud-based security services via a telemetry connection and/or via application programming interface (API) integration. In some examples, the endpoint security agent enables remote workers to connect to the network using zero-trust principles securely and may enable both Universal ZTNA and Virtual Private Network (VPN)-encrypted tunnels, as well as URL filtering and cloud access security broker (CASB). The endpoint security agent may additionally provide enhanced security capabilities through artificial intelligence (AI)-based NGAV, endpoint quarantine, and application firewall, as well as support for cloud sandbox, USB device control, and ransomware protection.

As used herein, a "network security appliance" or a "network security device" generally refers to a device or appliance in virtual or physical form that is operable to perform one or more security functions. A network security device may reside within the particular network that it is protecting, or network security may be provided as a service with the network security device residing in the cloud. Some network security devices may be implemented as general-purpose computers or servers with appropriate software to perform one or more security functions. Other network security devices may include custom hardware (e.g., one or more custom Application-Specific Integrated Circuits (ASICs)).

For example, while there are differences among network security device vendors, network security devices may be classified into three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines one or more CPUs, CPs, and NPs. Mid-range network security devices may include one or more multi-core CPUs, one or more separate NP Application-Specific Integrated Circuits (ASICs), and one or more CP ASICs. At the high end, network security devices may have multiple NPs and/or multiple CPs. A network security device is typically associated with a particular network (e.g., a private enterprise network) on behalf of which it provides one or more security functions.

Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DOS) detection and mitigation, encryption (e.g., Internet Protocol Secure (IPSec), TLS, SSL), application control, Voice over Internet Protocol (VOIP) support, Virtual Private Networking (VPN), data loss prevention (DLP), antispam, antispyware, logging, reputation-based protections, event correlation, network access control, vulnerability management, and the like. Such security functions may be deployed individually as part of a point solution or in various combinations as a unified threat management (UTM) solution.

Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, "Zero-Trust Network Access" or "ZTNA" generally refers to a set of technologies and functionalities that enable secure access to internal applications for local or remote users (e.g., utilizing on-net endpoint or client devices within an enterprise network or off-net endpoint or client devices outside of the enterprise network, respectively). ZTNA represents the evolution of VPN remote access, bringing the zero-trust model to application access. ZTNA may be used to authenticate and authorize access to resources based on identity, device, and/or contextual data. ZTNA solutions typically grant access on a per-session basis to individual applications only after devices and users are verified.

As used herein, a "ZTNA Access Point" or "ZTNA AP" generally refers to any hardware device, software application, or combination of hardware and software that may be used to control access to protected network devices, servers, resources, services, TCP applications, and/or databases by a requesting endpoint device. In some cases, a ZTNA AP runs one or more access proxies, including a TFAP. Depending on the particular implementation, a ZTNA may be provided in virtual or physical form. For example, a ZTNA AP may be a virtual node or container that runs one or more access proxies or a network security appliance (e.g., a UTM appliance) that runs one or more access proxies.

As used herein, a "secure connection" generally refers to a connection provided through a computer network by one or more protocols that secure communication and data transfers via the connection, for example, via end-to-end encryption. Non-limiting examples by which a secure connection may be established include HTTPS, Hypertext Transport Protocol version 1.1 (HTTP 1.1) over SSL, Hypertext Transfer Protocol version 2.0 (HTTP 2.0) over SSL, Hypertext Transfer Protocol version 3.0 (HTTP 3.0) over Quick User Datagram Protocol (UDP) Internet Connections (QUIC).

A "computer" or "computer system" may be one or more physical computers, virtual computers, or computing devices. As an example, a computer may be one or more server computers, cloud-based computers, cloud-based clusters of computers, virtual machine instances, or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers unless expressly stated otherwise.

The terms "connected" or "coupled" and related terms are used in an operational sense and are not necessarily limited to a direct connection or coupling. Thus, for example, two devices may be coupled directly or via one or more intermediary media or devices. As another example, devices may be coupled so that information can be passed between them without sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the"

includes plural reference unless the context clearly dictates otherwise. Also, as used in the description herein, the meaning of "in" includes "in" and "on" unless the context clearly dictates otherwise.

The phrases "in an embodiment," "according to one embodiment," "in an example," "in some examples," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

FIG. 1 is a block diagram illustrating operating environment 102 in which various embodiments of the present disclosure may be employed. In the context of the present example, multiple off-net clients (e.g., off-net client 120, off-net client 122, off-net client 124) access enterprise network 104 via public network 118 (e.g., the Internet). The off-net clients may represent endpoint or client devices (e.g., workstations, desktop computers, laptop computers, or mobile devices) used by remote workers associated with a particular organization or enterprise.

In an example, enterprise network 104 includes Lightweight Directory Access Protocol (LDAP) and Active Directory (AD) (LDAP and AD) server 110, access point 106, protected servers and resources 108, and multiple on-net clients (e.g., on-net client 112, on-net client 114, on-net client 116). In an example, the on-net clients are locally attached client devices used by onsite workers. In an example, access point 106 is a network security appliance operable within enterprise network 104. Access point 106 may be responsible for controlling access to protected servers and resources 108, which may include various protected network devices, servers, resources, services, TCP applications, and/or databases. For example, as is known in the art, access point 106 may evaluate policies to determine what devices and users can access a given target service of protected servers and resources 108.

In an example, when a given user session matches a policy, access point 106 may set up a proxy tunnel session (e.g., a TFAP tunnel) between an endpoint security agent (not shown), running on a requesting endpoint device (e.g., one of the off-net clients or one of the on-net clients) and acting as a proxy on behalf of a client application (e.g., a browser), and the target service. In some cases, the evaluation of the policies may include consulting LDAP and AD server 110 regarding a user's AD group and/or domain. For example, access to one or more of protected servers and resources 108 may be limited to a requesting endpoint that belongs to AD. In some examples, access to certain Virtual Local Area Networks (VLANs) may be based on the logged in user's AD group membership. Deny policies can be used with endpoints when they fall outside of security posture policies; for example, access may be denied to certain resources or network segments if an endpoint is tagged with critical vulnerabilities.

One or more components illustrated in FIG. 1 can utilize Zero-Trust Network Access (ZTNA) technologies and functionalities that enable secure access to internal applications for local or remote users (e.g., utilizing on-net endpoint or client devices within an enterprise network or off-net endpoint or client devices outside of the enterprise network, respectively). ZTNA may be used to authenticate and authorize access to resources based on identity, device, and/or contextual data. ZTNA solutions typically grant access on a per-session basis to individual applications only after devices and users are verified.

In an example, protected servers and resources 108 can include (or provide access to) validation server 126, which can further include (or provide access to) validation database (DB) 128. As described in greater detail below, validation server 126 can provide validation services to one or more client devices (e.g., off-net clients and/or on-net clients), including periodic re-validation of firmware that can identify an image that has replaced an authenticated image.

In an example, validation server 126 provides a set of new locations in the image whenever a new inquiry occurs, whether from the same client or a different client in order to avoid hackers simply modifying the verification function to hardcode the value in response. In other examples, fixed locations or other strategies can be implemented.

In an example, validation server 126 is coupled with validation database (DB) 128 that stores firmware hash values. If the hash value received by validation server 126 from the client device differs from the corresponding value in DB 128, then the firmware has been manipulated because the firmware hash value will be different if there is any change in the firmware, even if the functionality appears to be the same. Similar approaches can be applied to the validation of virtual machines.

Figure 2:
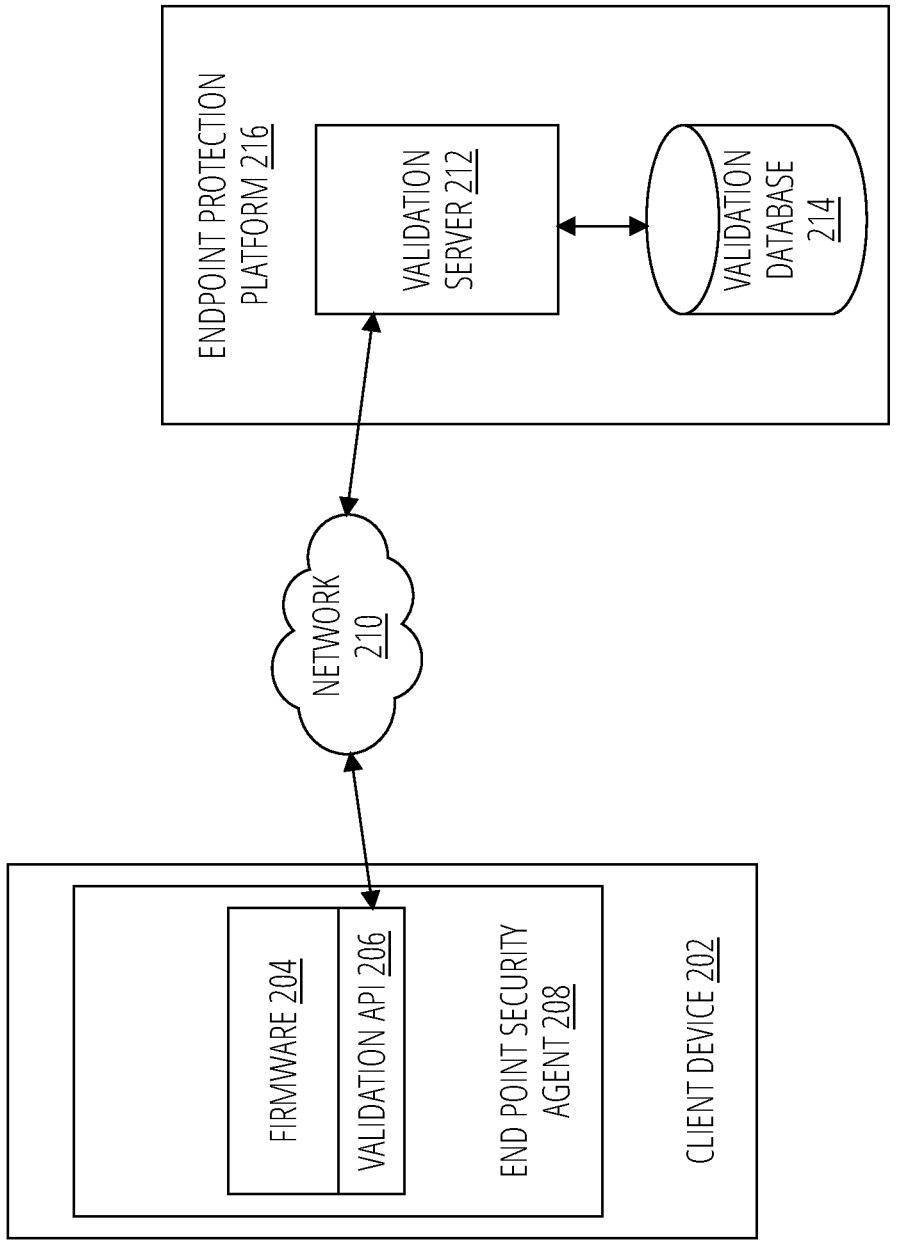
FIG. 2 is a block diagram of an example configuration for identifying an image that has replaced an authenticated image.

FIG. 2 is a block diagram of an example configuration for identifying an image that has replaced an authenticated image. The example of FIG. 2 illustrates a single client device communicating with a single validation server over a network; however, any number of client devices can be interconnected with any number of validation servers to provide the functionality described herein.

In the example of FIG. 2, client device 202 that runs end point security agent 208 and includes firmware 204 having validation API 206. Client device 202 can include any number of additional components (e.g., processors, memory, physical interfaces). Client device 202 can be, for example, an on-net client or an off-net client as described with respect to FIG. 1. Validation API 206 allows communication between firmware 204 and validation server 212 over network 210.

In an example, validation server 212 periodically requests, via network 210 and validation API 206, information related to one or more selected addresses in firmware 204. In an example, validation server 212 can request the contents of one or more addresses in firmware 204. As another example, validation server 212 can request a hash of the contents of one or more addresses in firmware 204. In an example, validation server 212 provides a set of new locations in the image whenever a new inquiry occurs, whether from the same client or a different client in order to avoid hackers simply modifying the verification function to hardcode the value in response. In other examples, fixed locations or other strategies can be implemented. Other types of information can also be requested. In an example, validation server 212 and/or validation database 214 can be part of endpoint protection platform 216.

Client device 202 returns, via validation API 206 and network 210, the information requested by validation server 212. Validation server 212 uses information from validation database 214 to analyze the information received from firmware 204 to evaluate the firmware image on client device 202.

In an example, validation API 206 can be implemented as a function in firmware 204. In another example, validation API 206 can be implemented in a function in lower (than firmware 204) layer software such as, for example, at the Basic Input/Output System (BIOS) or hypervisor level (as long as the lower-level function can report the information requested by validation server 212 from the firmware that it is running under. A hypervisor (or virtual machine monitor (VMM) or virtualizer) is software, hardware and/or firmware that creates and runs virtual machines.

In an example, the communication protocol between validation API 206 and validation server 212 can be based on Transmission Control Protocol/Internet Protocol (TCP/IP), which is based on technical standards maintained by The Internet Engineering Task Force (IETF).

As a specific use case example, validation API 206 can be implemented as a function call in an endpoint operating system, for example, FortiOS, available from Fortinet, Inc. of Sunnyvale, CA, through a Restful (Representational State Transfer) API call. Continuing the use case example, validation server 212 can maintain on validation database 214 correct hash values for all known firmware devices in the host system. The hash values can be for specific firmware addresses, combinations of addresses, etc.

In response to receiving the requested firmware information, validation server 212 can compare the received values to the corresponding stored values in validation database 214 to determine if a mismatch has occurred. A mismatch may indicate that a security vulnerability has been identified. In an example, validation server 212 can send a message to a system administrator and/or to an end user. In another example, validation server 212 can trigger one or more security responses including, for example, powering off client device 202, launching security software, isolating client device 202, etc.

Figure 3:
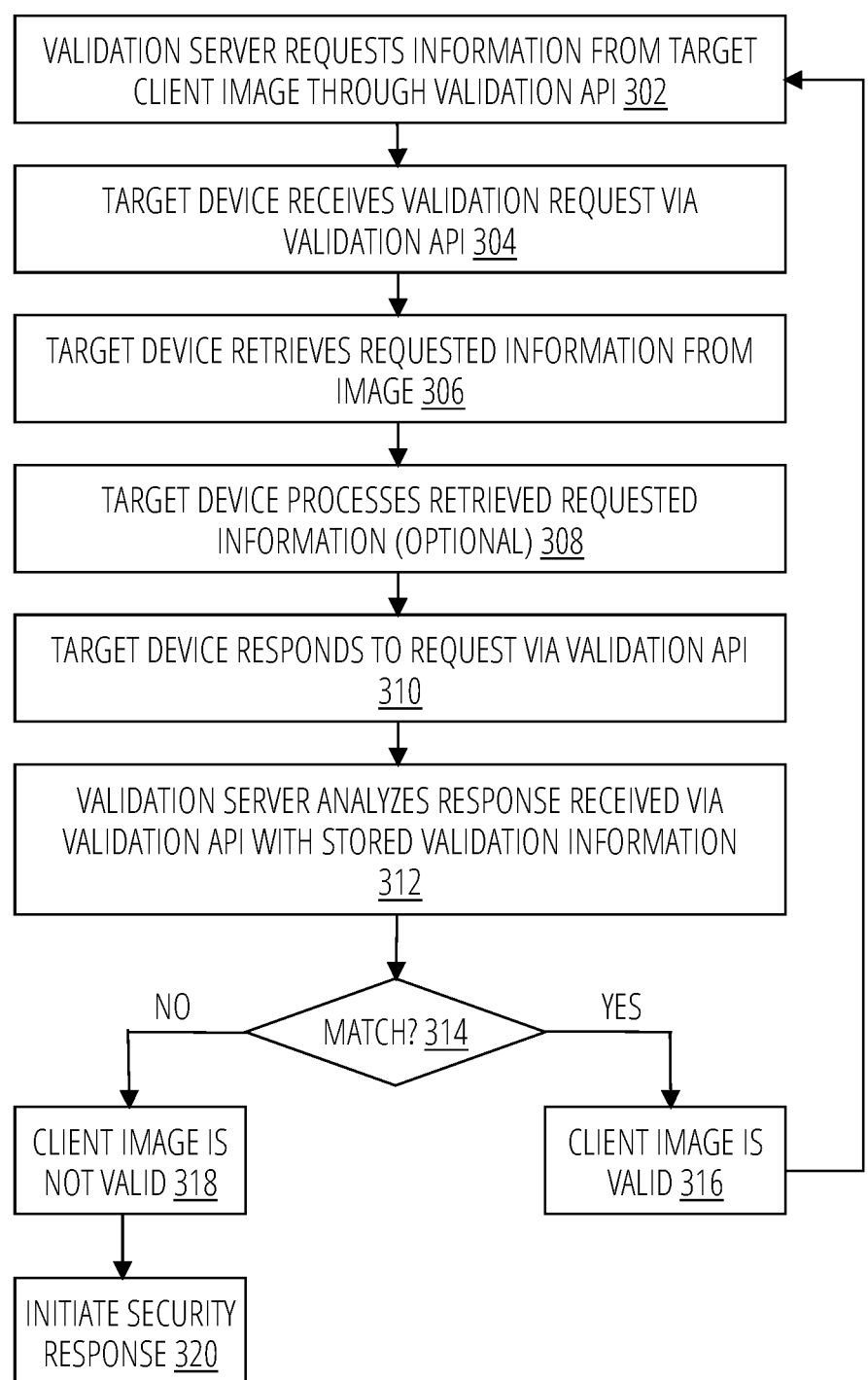
FIG. 3 is a flow diagram for an example approach to identifying an image that has replaced an authenticated image.

FIG. 3 is a flow diagram for an example approach to identifying an image that has replaced an authenticated image. The functionality described with respect to FIG. 3 assumes that an authenticated, approved image has been provided to a client device to be utilized in operating the client device. Various approaches can be used to achieve this result. Further, validation/verification information has been stored on a database (e.g., validation database 214) accessible by a validation server (e.g., validation server 126, validation server 212), or a similar device (e.g., an architecture comparable to FIG. 2). In an example, the database can store values (e.g., actual firmware image values, hash values for one or more locations) corresponding to one or more locations in the firmware image (or any number of firmware images if supporting multiple devices).

In an example, a validation server (e.g., validation server 126, validation server 212) can send a request for information through a validation API (e.g., validation API 206), 302. In an example, the request from the validation server can be a standalone request that is generated on a specified time interval (e.g., every 20 minutes, every hour, every 12 hours, once a day, once a week). In an example, the request for information from the target image can be bundled with other requests from the validation server. For example, the request can be included in a validation message, as well as a license validation request. Bundling the image validation requests with other requests may be useful to disguise image validation operations from malicious actors.

In an example, the validation request is can be for the information stored at a particular address (or multiple addresses). As another example, the validation request can be for the result of a hash function applied to the information stored at a particular address (or multiple addresses). In an example, the addresses requested can change over time.

The target device (e.g., client device 202) receives the request via the validation API, 304. As discussed above, the validation API can be implemented as a function call in an endpoint operating system, as a function in the firmware of the target device, as a function in lower layer software.

The target device retrieves the requested information from the image, 306. In an example, the target device reads information from one or more addresses identified in the validation request. In an example, the target device can process the retrieved requested information, 308. For example, the target device can generate one or more values using a hash function and the information from the one or more addresses. Other techniques (different from, or in addition to, use of the hash function) can also be performed.

The target device responds to the request via the validation API, 310. In an example, the target device generates a response message with the information requested in the request message from the validation server.

The validation server receives the response message from the target device via the validation API and analyses the response, 312. In an example, the validation server can maintain a database (e.g., validation database 214) having a copy of the validated images and/or correct hash values for the firmware image. The hash values can be for specific firmware addresses, combinations of addresses, etc.

In response to receiving the requested firmware information, the validation server can compare the received values to the corresponding stored values in the validation database to determine if the values match, 314, or if a mismatch has occurred. A mismatch may indicate that a security vulnerability has been identified. If the values match, 314, the client image is considered valid, 316, and the process can repeat as desired.

If the values do not match, 314, the client image is not valid, 318, and a security response is initiated, 320. In an example, the validation server can send a message to a system administrator and/or to an end user. In another example, the validation server can trigger one or more other security responses including, for example, powering off the client device, launching security software, isolating the client device, etc.

FIG. 4 is an example of a system (e.g., validation server or similar) to identify an image that has replaced an authenticated image. In an example, system 416 can include processor(s) 418 and non-transitory computer-readable storage medium 420. Non-transitory computer-readable storage medium 420 may store instructions 402, 404, 406, 410, 412 and 414 that, when executed by processor(s) 418, cause processor(s) 418 to perform various functions. Examples of processor(s) 418 may include a microcontroller, a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer-readable storage medium 420 include tangible media such as random-access memory (RAM), read-only memory (ROM), electrically erasable programmable read-only memory (EEPROM), flash memory, a hard disk drive, etc.

Instructions 402 cause processor(s) 418 to request information from a target client image through a validation API. As discussed above, the image validation requests can be combined with other types of validation (or security) requests (e.g., license validations, system scan triggers). The firmware image validation requests can be for one or more locations/addresses within the firmware image. These locations can be varied over time (e.g., randomly selected) or can be selected based on the contents of a valid firmware image or based on addresses likely to be changed to cause a security vulnerability and/or other selection criteria.

Instructions 404 cause processor(s) 418 to receive a response message from the target client device. The response message can have the requested information corresponding to the target firmware image. In an example, the target device can do some processing of the information retrieved from the target image. In another example, the target device can return unprocessed information that can be subsequently processed by the validity server (e.g., performing a hash or other mathematical operation).

Instructions 406 cause processor(s) 418 to retrieve validation information from a validation database. In an example, the validation database can store expected values to be used to validate one or more images on client devices. In an example, the validation database can store one or more validated images, hash values for one or more image locations, and/or other validation information.

Instructions 408 cause processor(s) 418 to compare the information received from the target client device with information retrieved from the validation database. Instructions 410 cause processor(s) 418 to determine if the information received from the target client device matches the information retrieved from the validation database.

Instructions 412 cause processor(s) 418 to respond to a match condition. In an example, the response includes an indication of match and/or validation and any necessary operations to repeat the validation process as described above.

Instructions 414 cause processor(s) 418 to respond to a mismatch condition. In an example, the validation server can send a message to a system administrator and/or to an end user. In another example, the validation server can trigger one or more other security responses including, for example, powering off the client device, launching security software, isolating the client device, etc.

Figure 5:
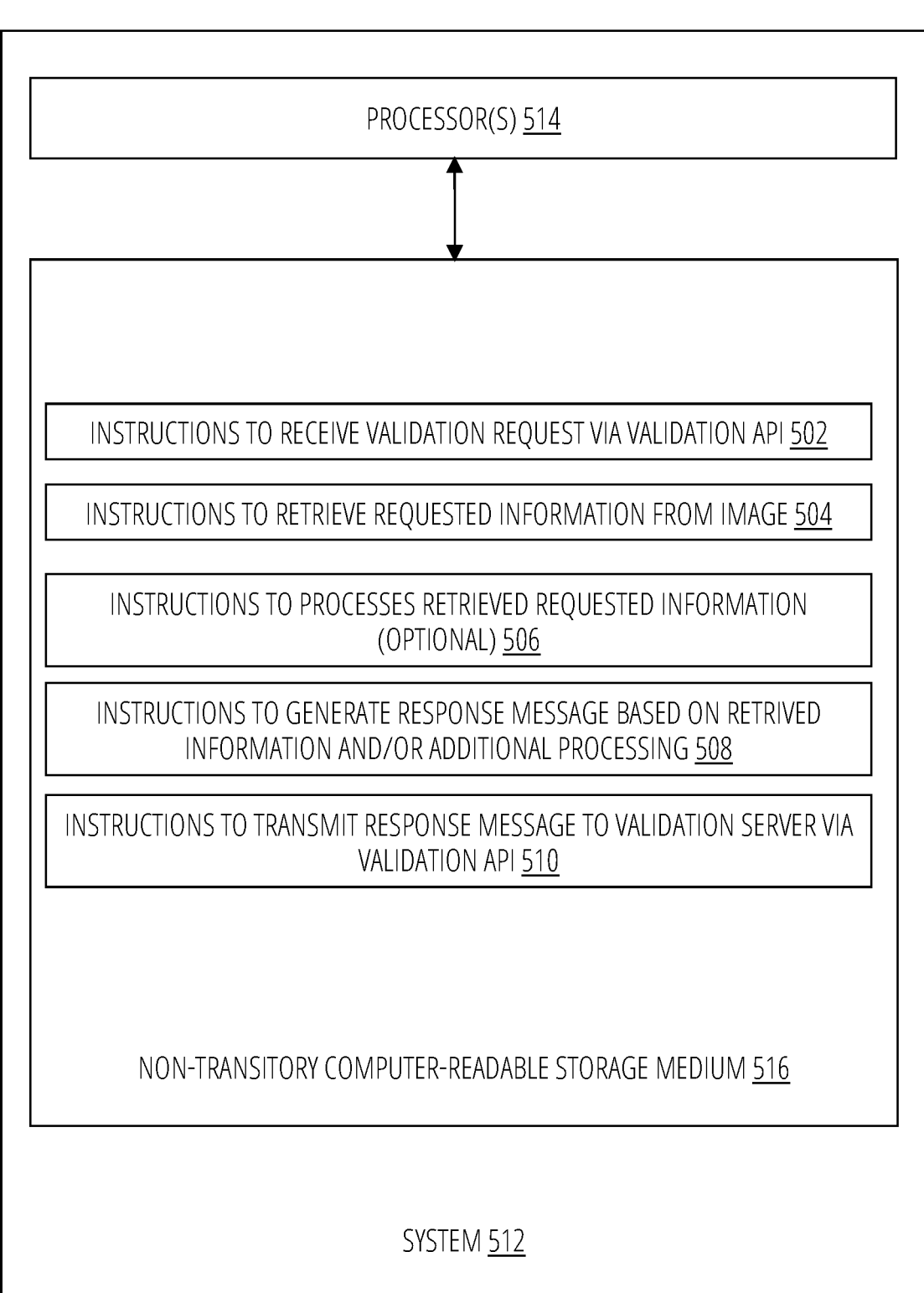
FIG. 5 is an example of a system (e.g., target device or similar) to identify an image that has replaced an authenticated image.

FIG. 5 is an example of a system (e.g., target system or similar) to identify an image that has replaced an authenticated image. In an example, system 512 can include processor(s) 514 and non-transitory computer-readable storage medium 516. Non-transitory computer-readable storage medium 516 may store instructions 502, 504, 506 and 510 that, when executed by processor(s) 514, cause processor(s) 514 to perform various functions. Examples of processor(s) 514 may include a microcontroller, a microcontroller, a microprocessor, a CPU, a GPU, a DPU, an ASIC, a FPGA, a SoC, etc. Examples of non-transitory computer-readable storage medium 516 include tangible media such as RAM, ROM, EEPROM, flash memory, a hard disk drive, etc.

Instructions 502 cause processor(s) 514 to receive a validation request via the validation API. As discussed above, the image validation requests can be combined with other types of validation (or security) requests (e.g., license validations, system scan triggers). The firmware image validation requests can be for one or more locations/addresses within the firmware image. These locations can be varied over time (e.g., randomly selected) or can be selected based on the contents of a valid firmware image or based on addresses likely to be changed to cause a security vulnerability and/or other selection criteria.

Instructions 504 cause processor(s) 514 to retrieve the requested information from the target firmware image. The requested information can correspond to one or more addresses. Additional information can also be requested.

Instructions 506 cause processor(s) 514 to process the retrieved information. This processing is optional and, in some examples, is not performed or can be performed by the validation server. The additional processing can include, for example, generating a result of a hash function using the retrieved information. Additional and/or different processing can also be supported.

Instructions 508 cause processor(s) 514 to generate a response message that includes the requested information. Instructions 510 cause processor(s) 514 to transmit the response message to the validation server via the validation API.

Figure 6:
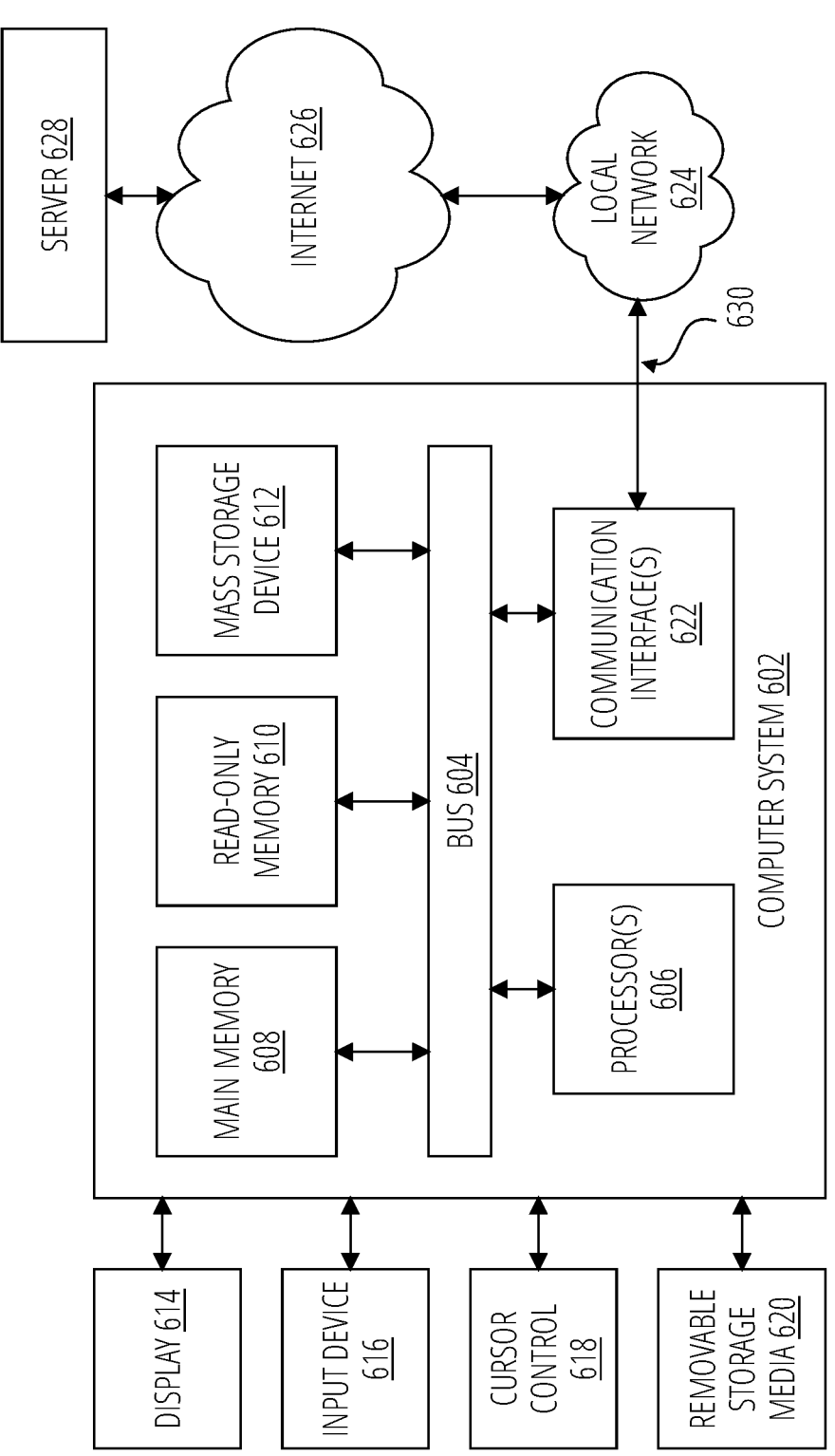
FIG. 6 is a block diagram that illustrates a computer system in which or with which an embodiment of the present disclosure may be implemented.

FIG. 6 is a block diagram that illustrates a computer system in which or with which an embodiment of the present disclosure may be implemented. Computer system 602 may be representative of an endpoint or client device (e.g., one of the off-net clients or on-net clients) on which an endpoint security agent is running and acting as a proxy on behalf of a client application (e.g., a browser). Notably, components of computer system 602 described herein are meant only to exemplify various possibilities. In no way should example computer system 602 limit the scope of the present disclosure. In the context of the present example, computer system 602 includes bus 604 or other communication mechanism for communicating information and one or more processing resources (e.g., one or more hardware processor(s) 606) coupled with bus 604 for processing information. Hardware processor(s) 606 may include, for example, one or more general-purpose microprocessors available from one or more current or future microprocessor manufacturers (e.g., Intel Corporation, Advanced Micro Devices, Inc., and/or the like) and/or one or more special-purpose processors (e.g., CPs, NPs, and/or accelerators or co-processors). In some examples, one or more processing resources may be part of an ASIC-based security processing unit (e.g., the FORTISP family of security processing units available from Fortinet, Inc. of Sunnyvale, CA).

Computer system 602 also includes main memory 608, such as a random-access memory (RAM) or other dynamic storage device, coupled to bus 604 for storing information and instructions to be executed by processor(s) 606. Main memory 608 also may be used for storing temporary variables or other intermediate information during execution of instructions to be executed by processor(s) 606. Such instructions, when stored in non-transitory storage media accessible to processor(s) 606, render computer system 602 into a special-purpose machine customized to perform the operations specified in the instructions.

Computer system 602 includes a read-only memory 610 or other static storage device coupled to bus 604 for storing static information and instructions for processor(s) 606. Mass storage device 612 (e.g., a magnetic disk, optical disk or flash disk (made of flash memory chips), is provided and coupled to bus 604 for storing information and instructions.

Computer system 602 may be coupled via bus 604 to display 614 (e.g., a cathode ray tube (CRT), Liquid Crystal Display (LCD), Organic Light-Emitting Diode Display (OLED), Digital Light Processing Display (DLP) or the like, for displaying information to a computer user. Input device 616, including alphanumeric and other keys, is coupled to bus 604 for communicating information and command selections to processor(s) 606. Another type of user input device is cursor control 618, such as a mouse, a trackball, a trackpad, or cursor direction keys for communicating direction information and command selections to processor(s) 606 and for controlling cursor movement on display 614. This input device typically has two degrees of freedom in two axes, a first axis (e.g., x) and a second axis (e.g., y), that allows the device to specify positions in a plane.

Removable storage media 620 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 602 may implement the techniques described herein using customized hard-wired logic, one or more ASICs or FPGAs, firmware or program logic which in combination with the computer system causes or programs computer system 602 to be a special-purpose machine. According to one embodiment, the techniques herein are performed by computer system 602 in response to processor(s) 606 executing one or more sequences of one or more instructions contained in main memory 608. Such instructions may be read into main memory 608 from another storage medium, such as mass storage device 612. Execution of the sequences of instructions contained in main memory 608 causes processor(s) 606 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic, or flash disks, such as mass storage device 612. Volatile media includes dynamic memory, such as main memory 608. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wires, and fiber optics, including the wires that comprise bus 604. Transmission media can also be acoustic or light waves, such as those generated during radio-wave and infrared data communications.

Various forms of media may be involved in carrying one or more sequences of one or more instructions to processor(s) 606 for execution. For example, the instructions may initially be carried on a magnetic disk or solid-state drive of a remote computer. The remote computer can load the instructions into its dynamic memory and send the instructions over a telephone line using a modem. A modem local to computer system 602 can receive the data on the telephone line and use an infra-red transmitter to convert the data to an infra-red signal. An infra-red detector can receive the data from the infra-red signal, and appropriate circuitry can place the data on bus 604. Bus 604 carries the data to main memory 608, from which processor(s) 606 retrieve and execute the instructions. The instructions received by main memory 608 may optionally be stored on mass storage device 612 either before or after execution by processor(s) 606.

Computer system 602 also includes communication interface(s) 622 coupled to bus 604. Communication interface(s) 622 provides a two-way data communication coupling to network link 630 that is connected to local network 624. For example, communication interface(s) 622 may be an integrated services digital network (ISDN) card, cable modem, satellite modem, or a modem to provide a data communication connection to a corresponding type of telephone line.

Another example is communication interface(s) 622, which may be a local area network (LAN) card that provides a data communication connection to a compatible LAN. Wireless links may also be implemented. In any such implementation, communication interface(s) 622 sends and receives electrical, electromagnetic or optical signals that carry digital data streams representing various types of information.

Network link 630 typically provides data communication through one or more networks to other data devices. Local network 624 and internet 626 both use electrical, electromagnetic or optical signals that carry digital data streams. The signals through the various networks and network link 630 and through communication interface(s) 622, which carry the digital data to and from computer system 602, are example forms of transmission media.

Computer system 602 can send messages and receive data, including program code, through the network(s), network link 630 and communication interface(s) 622. In the Internet example, server 628 might transmit a requested code for an application program through internet 626, local network 624 and communication interface(s) 622. The received code may be executed by processor(s) 606 as it is received or stored in mass storage device 212 or other non-volatile storage for later execution.

Embodiments may be implemented as any or a combination of one or more microchips or integrated circuits interconnected using a parent board, hardwired logic, software stored by a memory device and executed by a microprocessor, firmware, an application-specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include but is not limited to, floppy diskettes, optical disks, CD-ROMs (Compact Disc-Read Only Memories), magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown, nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as the following claims.

Reference in the specification to "one example" or "an example" means that a particular feature, structure, or characteristic described in connection with the example is included in at least one embodiment of the disclosure. The appearances of the phrase "in one example" in various places in the specification do not necessarily refer to the same embodiment.

It is contemplated that any number and type of components may be added to and/or removed to facilitate various embodiments, including adding, removing, and/or enhancing certain features. For brevity, clarity, and ease of understanding, many standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component," "module," "system," and the like as used herein are intended to refer to a computer-related entity, either software-executing general-purpose processor, hardware, firmware, or a combination thereof. For example, a component may be, but is not limited to, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer-readable media with various data structures stored thereon. The components may communicate via local and/or remote processes, such as in accordance with a signal having one or more data packets (e.g., data from one component interacting with another component in a local system, distributed system, and/or across a network such as the Internet with other systems via the signal).

Computer-executable components can be stored, for example, on non-transitory, computer-readable media including, but not limited to, an ASIC, CD, DVD, ROM, floppy disk, hard disk, EEPROM, memory stick or any other storage device type, in accordance with the claimed subject matter.

What is claimed is:

1. A method comprising:

periodically requesting, with a validation server that is part of an endpoint protection platform, information corresponding to one or more addresses in an image stored on a client device having an endpoint security agent via an application program interface (API) configured to provide access to the image on the client device, wherein the validation server provides a set of new addresses in the image for each new inquiry;

receiving, with the validation server, the requested information from the client device via the API;

comparing the requested information from the image on the client device with stored validation information corresponding to a valid version of the image;

generating an indication that the image on the client device has been modified if the information from the image on the client device does not match the stored validation information.

2. The method of claim 1 wherein the information from the image on the client device comprises a hash of data from one or more specified addresses within the image on the client device.

3. The method of claim 1 wherein the periodic requesting is part of a validation or verification process not related to the image stored on the client device.

4. The method of claim 1 wherein the image corresponds to firmware on the client device.

5. The method of claim 1, wherein the API is implemented as a function call in an endpoint operating system through a representational state transfer (RESTful) API call.

6. The method of claim 1, wherein the API is implemented as a function in the image stored on the client device.

7. The method of claim 1, wherein the API is implemented as a function in a Basic Input/Output System (BIOS) of the client device.

8. The method of claim 1, wherein the API is implemented as a function in a hypervisor running on the client device.

9. A non-transitory computer-readable medium having stored thereon instructions that, when executed by one or more processors, are configurable to cause the one or more processors to:

periodically request, with a validation server that is part of an endpoint protection platform, information corresponding to one or more addresses in an image stored on a client device having an endpoint security agent via an application program interface (API) configured to provide access to the image on the client device, wherein the validation server provides a set of new addresses in the image for each new inquiry;

receive, with the validation server, the requested information from the client device via the API;

compare the requested information from the image on the client device with stored validation information corresponding to a valid version of the image;

generate an indication that the image on the client device has been modified if the information from the image on the client device does not match the stored validation information.

10. The non-transitory computer-readable medium of claim 9 wherein the information from the image on the client device comprises a hash of data from one or more specified addresses within the image on the client device.

11. The non-transitory computer-readable medium of claim 9 wherein the periodic requesting is part of a validation or verification process not related to the image stored on the client device.

12. The non-transitory computer-readable medium of claim 9 wherein the image corresponds to firmware on the client device.

13. The non-transitory computer-readable medium of claim 9 wherein the API is implemented as a function call in an endpoint operating system through a representational state transfer (RESTful) API call.

14. The non-transitory computer-readable medium of claim 9 wherein the API is implemented as a function in the image stored on the client device.

15. The non-transitory computer-readable medium of claim 9 wherein the API is implemented as a function in a Basic Input/Output System (BIOS) of the client device.

16. The non-transitory computer-readable medium of claim 9 wherein the API is implemented as a function in a hypervisor running on the client device.

17. A computing device comprising:

a memory system; and a processor coupled with the memory system, the processor configurable to:

periodically request, with a validation server that is part of an endpoint protection platform, information corresponding to one or more addresses in an image stored on a client device having an endpoint security agent via an application program interface (API) configured to provide access to the image on the client device, wherein the validation server provides a set of new addresses in the image for each new inquiry;

receive, with the validation server, the requested information from the client device via the API;

compare the requested information from the image on the client device with stored validation information corresponding to a valid version of the image;

generate an indication that the image on the client device has been modified if the information from the image on the client device does not match the stored validation information.

18. The computing device of claim 17 wherein the API is implemented as a function call in an endpoint operating system through a representational state transfer (RESTful) API call.

19. The computing device of claim 17 wherein the API is implemented as a function in the image stored on the client device.

20. The computing device of claim 17 wherein the API is implemented as a function in a hypervisor running on the client device.

* * * * *